US008023552B2

(12) United States Patent  
Balachandran et al.

(10) Patent No.: US 8,023,552 B2  
(45) Date of Patent: Sep. 20, 2011

(54) METHODS OF DISCOVERING NEIGHBORS IN OPPORTUNISTIC OPEN ACCESS AD HOC WIRELESS NETWORKS

(75) Inventors: Krishna Balachandran, Morganville, NJ (US); Joseph H Kang, Belle Mead, NJ (US)

(73) Assignee: Alcatel Lucent, Paris (FR)

( * ) Notice: Subject to any disclaimer, the term of this patent is extended or adjusted under 35 U.S.C. 154(b) by 1311 days.

(21) Appl. No.: 11/525,495

(22) Filed: Sep. 22, 2006

(65) Prior Publication Data

US 2008/0075145 A1 Mar. 27, 2008

(51) Int. Cl.  
*H04B 1/713* (2011.01)

(52) U.S. Cl. .................................................. 375/133

(58) Field of Classification Search ........... 375/132–137  
See application file for complete search history.

(56) References Cited

U.S. PATENT DOCUMENTS

| 7,114,010 | B2 * | 9/2006 | Karaoguz et al. | 709/250 |
| 7,366,223 | B1 * | 4/2008 | Chen et al. | 375/132 |
| 2003/0198200 | A1 | 10/2003 | Diener et al. | 370/329 |
| 2003/0214961 | A1 * | 11/2003 | Nevo et al. | 370/401 |
| 2005/0176371 | A1 | 8/2005 | Palin et al. | 455/41.2 |

FOREIGN PATENT DOCUMENTS

WO    WO 02/089430 A1    11/2002

OTHER PUBLICATIONS

PCT/US2007/011761, Nov. 28, 2007, PCT Search Report.  
Laura Galluccio, et al, "Analytical Evaluation of a Tradeoff Between Energy Efficiency and Responsiveness of Neighbor Discovery in Self-Organizing Ad Hoc Networks," *IEEE Journal on Selected Areas in Communications*, vol. 22, No. 7, (9-04), pp. 1167-1182.

* cited by examiner

*Primary Examiner* — Kevin Kim  
(74) *Attorney, Agent, or Firm* — Carl Bilicska

(57) ABSTRACT

In an ad hoc wireless network, for purposes of neighbor discovery, a transmitting node transmits a beacon within a timeslot and at a frequency that varies from timeslot-to-timeslot according to one or more associated and known pseudo-random or cyclical frequency hopping sequences. When, during a timeslot, the frequency hopping sequence would select a beacon frequency that if transmitted would violate spectrum policy that is in place during that timeslot, then, during that timeslot, a beacon is not transmitted during that timeslot. During each timeslot, a neighbor receiving node attempts to detect and decode a transmitted beacon at a frequency specified by the frequency hopping sequence that it expects a transmitting node to be using. When a receiving node successfully detects and decodes a beacon transmitted by a transmitting node, neighbor discovery between the transmitting and receiving nodes is achieved.

11 Claims, 12 Drawing Sheets

METHODS OF DISCOVERING NEIGHBORS IN OPPORTUNISTIC OPEN ACCESS AD HOC WIRELESS NETWORKS

GOVERNMENT CONTRACT

This invention was made with Government support under Contract CNS 0434854 1/3 awarded by the National Science Foundation. The Government has certain rights in this invention.

TECHNICAL FIELD

The present invention relates to wireless communications.

BACKGROUND OF THE INVENTION

Spectrum allocations are carried out according to prevailing regulatory policies in different regions throughout the world. Except for small blocks of spectrum that have been set aside for unlicensed operation, spectrum is typically treated as property with associated ownership rights. Since spatial and temporal usage of spectrum varies according to the traffic demands from different services, such static allocations create an illusion of spectrum scarcity, i.e., the unavailability of spectral resources at a particular location and time. Recently, there has been considerable interest in designing Media Access Control (MAC) and physical layer techniques that allow open, opportunistic access to spectrum. This capability is desirable not only to address the long-term projected capacity demands of commercial, military and public safety applications, but also to enable unlicensed commercial or tactical military communications without any frequency planning or coordination.

Physical layer techniques, protocols and algorithms employed in evolving cellular and wireless Local Area Network technologies (e.g., IEEE 802.11) are typically designed assuming a static, contiguous spectrum allocation constraint and are often limited to narrowband operation (tens of kHz to a few MHz). In the future, advances in dynamic spectrum access techniques such as spectrum sensing and characterization, frequency agility, and dynamic radio bearer management hold the promise of huge improvements in spectrum utilization relative to current static allocations by providing the ability to exploit temporal and spatial variability in spectrum availability.

One of the outstanding challenges in ad hoc networks based on opportunistic, open spectrum access is on the design of techniques that help achieve initial neighbor discovery and association of new nodes with a neighborhood. In particular, when spectrum is not exclusively allocated to users and/or networks, users must discover the presence of neighboring users by searching across a wide range of frequencies with minimum transmit/receive power requirements and with minimum delay. This needs to be carried out in advance of opportunistic establishment of radio bearers for control and/or data transfer. Another challenge in a dynamic spectrum access framework is to ensure that the neighbor discovery process does not result in excessive interference related to co-existence with non-cooperative nodes (e.g. belonging to legacy networks). Careful consideration must be given to such co-existence scenarios when designing protocols and algorithms that enable open spectrum access.

Neighbor discovery typically involves transmission of beacons (probe messages) subject to certain criteria and also scanning for beacons from candidate neighbor nodes. These probe messages may indicate several parameters of interest including the address (or identifier) of the node, location, spectral quality measurements etc. which may be used for resource allocation, routing or forwarding decisions and energy conservation. Neighbor discovery is said to occur upon successful detection and decoding of a probe message from a cooperative node whose presence was previously unknown.

While it may be possible to improve neighbor discovery performance by limiting beacon transmissions to a fixed, pre-determined region of the spectrum, such an approach is not scalable, e.g. to support open spectrum access networks with large numbers of cooperative nodes or large numbers of co-existing networks. Furthermore, fixed regions of the spectrum are also highly susceptible to jamming or interference from non-cooperative nodes, thus making it difficult for cooperative nodes to discover each other. If cooperative nodes are not able to discover each other, then opportunistic use of spectrum for data transfer between these nodes is not possible.

The state of the art on neighbor discovery focuses on static and/or small allocations of spectrum. For example, Wireless Local Area networks based on 802.11x standards use different beacon frame transmission and reception techniques depending on the mode of operation. In an infrastructure mode, Access Points carry out periodic beacon frame transmissions on a frequency channel and all other nodes scan across different channels to detect the presence of Access Points. In an ad hoc mode, each node that is attempting discovery scans for beacons over a certain time period and transmits a beacon on a particular channel after a random delay if none are detected. The results of a performance analysis of neighbor discovery for ad hoc networks with random beacon transmission and random reception is described by L. Gallulccio, G. Marbit and S. Palazzo, in "Analytical Evaluation of a Tradeoff Between Energy Efficiency and Responsiveness of Neighbor Discovery in Self-Organizing Ad Hoc Networks," *IEEE Journal on Selected Areas in Communications*, Vol. 22, No. 7, September 2004. That work was based on pre-fixed frequency carrier sets and does not apply to a dynamic spectrum access framework where frequencies deemed acceptable for beacon transmission and/or reception may vary from node to node according to the perceived spectral quality. Furthermore, no consideration was given to policy constraints associated with opportunistic open access wireless networks.

SUMMARY OF THE INVENTION

In accordance with an embodiment of the present invention, when in a state of neighbor discovery and transmitting beacons, a transmitting node transmits a beacon within a timeslot AND at a frequency that varies from timeslot-to-timeslot according to one or more associated and known pseudo-random or cyclical frequency hopping sequences. When, during a timeslot, the frequency hopping sequence would select a beacon frequency that if transmitted would violate an existing spectrum policy in place during that timeslot, then, during that timeslot, a beacon is not transmitted. During each timeslot, a neighbor receiving node attempts to detect and decode a transmitted beacon at a frequency specified by the frequency hopping sequence that it expects a transmitting node to be using. When a receiving node successfully detects and decodes a beacon transmitted by a transmitting node, neighbor discovery between the transmitting and receiving nodes is achieved.

In a Single Frequency Hopping Sequence (SFHS) embodiment, a transmitting node uses a single frequency hopping sequence to determine the successive transmission frequencies and determines for each timeslot whether transmission during that timeslot at the frequency specified by the hopping sequence violates spectrum policy. A beacon is not transmitted during a timeslot at the frequency specified by the hopping sequence if spectrum policy would be violated. The receiving node attempts to detect and decode during a timeslot at a frequency determined by that same known frequency hopping sequence.

In a Multiple Frequency Hopping Sequences with Random Sequence Selection (MFHS-RSS) embodiment, the transmitting and receiving nodes independently randomly choose from among multiple frequency hopping sequences for each timeslot. When, during a timeslot, the chosen hopping sequence would result in the transmission of a beacon at a frequency that would violate existing spectrum policy, a beacon is not transmitted during that timeslot. During each timeslot, the receiving node randomly selects one of the possible hopping sequences and decodes at the frequency specified by that selected hopping sequence for that timeslot.

In a Multiple Frequency Hopping Sequences with Policy-Based Sequence Selection (MFHS-PBSS) embodiment, multiple frequency hopping sequences are similarly allowed. Attempts are made during each timeslot, however, to maximize the probability that a transmission will be allowed per prevailing spectrum policy by pruning the possible multiple hopping sequences used by a transmitting node to only those that would specify a transmission frequency that is allowed by spectrum policy, and then randomly selecting one of those hopping sequences and its associated frequency for transmitting the beacon during that timeslot. If none of the hopping sequences has an associated frequency that is allowed by spectrum policy during that timeslot, then no beacon transmission is made during that timeslot. As in the previous embodiment, during each timeslot the receiving node randomly selects one of the possible hopping sequences and attempts to decode on the frequency specified by that hopping sequence during that timeslot.

In a Multiple Frequency Hopping Sequences with Sequential Energy Detection and Decoding (MFHS-SeEDD) embodiment, transmitting and receiving nodes enter transmit, receive and idle discovery states in frames consisting of L timeslots. Operation at the transmitting node is similar to the MFHS-RSS embodiment with a single hopping sequence being used within a frame. The receiving node performs energy detection across the first $L_{ED}$ timeslots of the L-length frame to reduce the number of candidate hopping sequences that might have been used for transmission of the beacon. In the last $L_{DEC}$ timeslots of the frame, the receiving node randomly attempts to decode based on the reduced set of candidate sequences determined during the first $L_{ED}$ timeslots.

In a Multiple Frequency Hopping Sequences with Simultaneous Energy Detection and Decoding (MFHS-SiEDD) embodiment, energy detection and decoding are performed in the same timeslot, or based on information gathered by energy detection in previous timeslots within an L-length frame.

DETAILED DESCRIPTION

Although the following is described as being based on a generic wireless communication network or system supporting ad hoc communication in unlicensed spectrum, and will be described in this exemplary context, it should be noted that the exemplary embodiments shown and described herein are meant to be illustrative only and not limiting in any way. Additionally where used below, the term "node" may be considered synonymous with user equipment, terminal, mobile terminal, sensor node, subscriber, user, remote station, mobile station, access terminal, etc., and describes a remote user of wireless resources in a wireless communication network.

Figure 1:
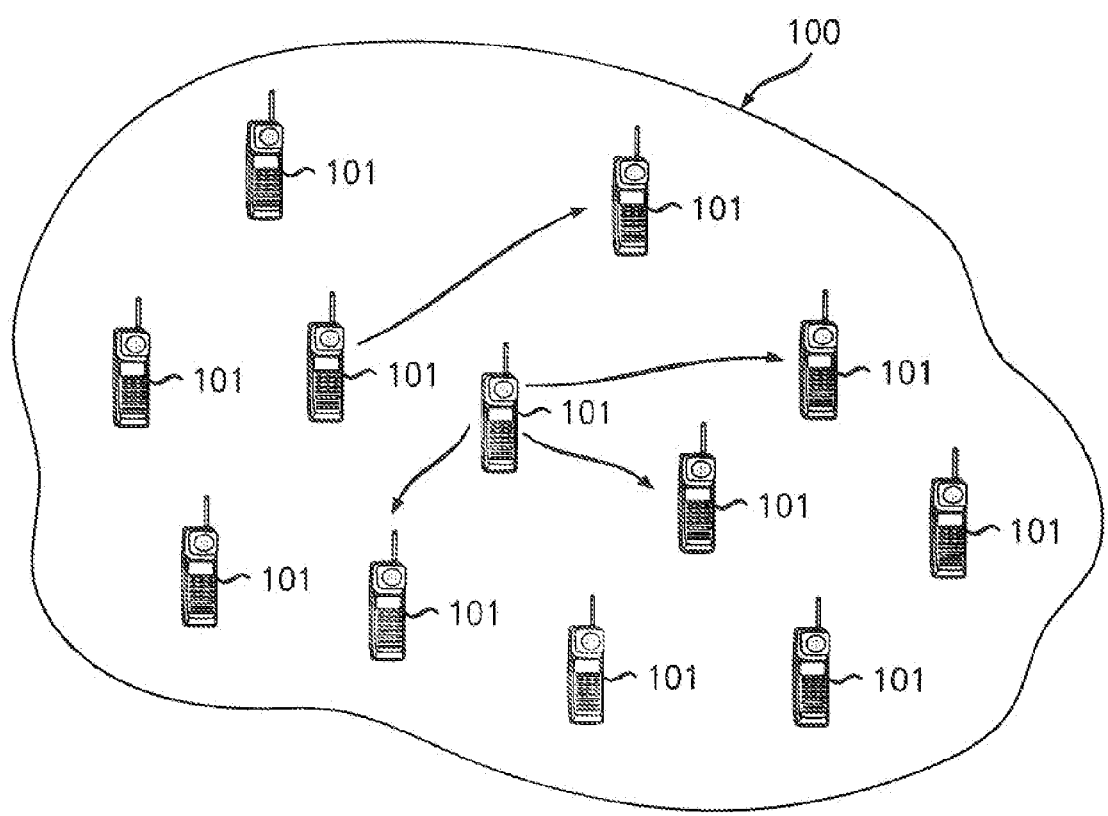
FIG. 1 is a block diagram showing a neighborhood of nodes in an ad hoc wireless network that might at some time be desirous of communicating with each other in either a one-to-one basis or one-to-many basis.

FIG. 1 is a block diagram of an ad hoc wireless communications system 100 in which plural mobile nodes 101 are capable of communicating with each other. Each node 101 has a transmitter for transmitting messages to one or a plurality of the other terminals. Similarly, each node 101 has a receiver for receiving the messages sent to it by another node 101. Messages that are transmitted by a node 101 can be sent point-to-point (i.e., unicast) to another node within the transmitting node's communications range, can be sent to a targeted group of nodes (i.e., multicast within the transmitting node's communications range, or can be sent to all nodes within the transmitting node's communications range (i.e., broadcast). A message header may specify the message type (i.e., unicast, multicast or broadcast), and if unicast or multicast, the intended node or group recipient. Whereas all ad hoc messages are broadcast in nature, such that all nodes within communications range can attempt to decode the message, specification of the message type in the message header allows nodes to increase battery life by ignoring payloads of messages for which it is not an intended recipient. In addition, the payload may be encrypted.

Beacon transmissions may occur on a single frequency or may occur on multiple frequencies that may either be contiguous or non-contiguous; for simplicity, it is assumed that the transmission occurs on a single frequency. Furthermore, time-slotted beacon transmissions and idle periods where no transmission or reception occurs in order to conserve energy are assumed. Nodes are also assumed to be time-synchronized through the availability of a common system time reference at each node (e.g. via GPS capability within each node). Neighbor discovery may also be carried out with asynchronous nodes using timing acquisition techniques, but this may take longer than the synchronous case.

At any point in time, a node may be transmitting beacons, attempting to receive beacons, or be idle (i.e., neither transmitting beacons nor attempting to receive beacons). Beacons are assumed to contain sufficient information (e.g. mobile ID, group ID, policy information, available protocols, etc.) so as to allow nodes to communicate with each other after discovery is achieved. Hence, for the purposes of this description herein, neighbor discovery is assumed to be achieved when a node transmits a beacon and a neighboring node receives that beacon and successfully decodes it.

Various embodiments of methods for neighbor discovery are described in greater detail below.

In a Single Frequency Hopping Sequence (SFHS) neighbor discovery embodiment, the transmitting node uses a single cyclical or pseudo-random frequency hopping sequence to determine transmission frequencies during those successive timeslots when discovery is taking place. Since the hopping sequence is pre-determined, the transmitting node determines for each timeslot whether transmission of a beacon at the frequency specified by the hopping sequence would violate spectrum policy during that timeslot. If such a transmission would violate spectrum policy, a beacon is not transmitted during that timeslot. The receiving node attempts to decode during a timeslot and on a frequency channel according to the same frequency hopping sequence. Since the transmitting and receiving nodes use the same single hopping sequence, there is no ambiguity as to the frequency at which a beacon transmission will occur during each timeslot. Hence, if a transmitting node transmits a beacon, a neighboring receiving node that seeks to receive beacon transmissions is likely to receive the beacon and complete neighbor discovery with the transmitting node provided the prevailing radio frequency (RF) conditions are sufficient.

Figure 2:
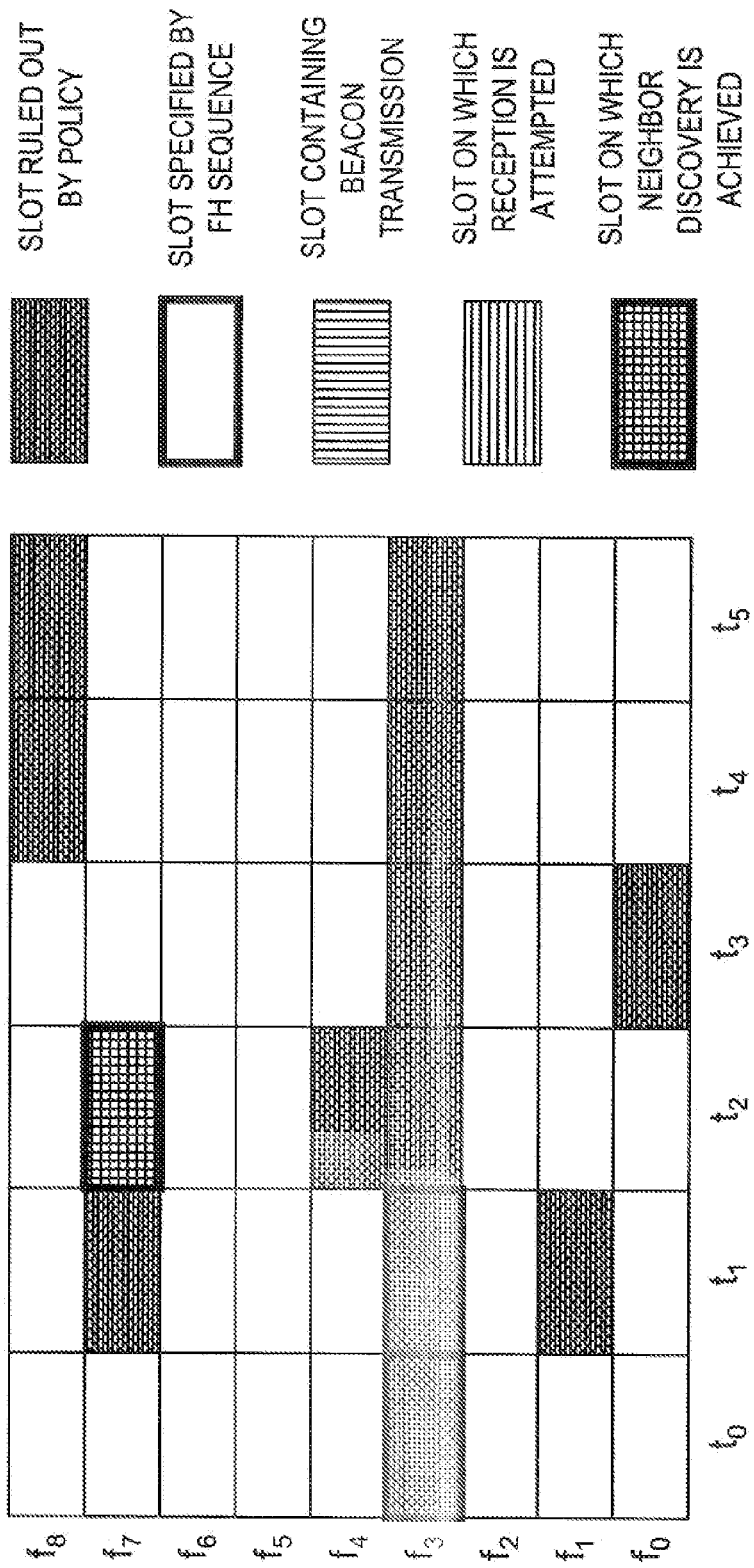
FIG. 2 shows an example of the SFHS embodiment.

FIG. 2 illustrates an example of the operation of this method with two nodes attempting to discover each other as neighbors. In the general case, as previously noted, each node from timeslot to timeslot (or from frame to frame where each frame consists of multi-slots) may be transmitting beacons, attempting to receive beacons, or be in an idle state. However, for simplicity, it is assumed that when policy allows it, a first node continuously seeks to transmit and a second node continuously seeks to receive. Discovery occurs when the second node successfully receives a beacon that is being transmitted by the first node. In FIG. 2, the frequency hopping (FH) sequence specifies $f_3$ as the beacon frequency during the first two timeslots, $t_0$ and $t_1$. In this illustrative example, transmission during these first two timeslots at $f_3$ is disallowed by spectrum policy, as noted in the figure, and thus does not occur. During the third timeslot, $t_3$, the frequency specified by the frequency hopping sequence is $f_7$, which is not disallowed by spectrum policy, and the transmitting node is thus allowed to transmit a beacon at that frequency. Since there is a single frequency hopping sequence utilized by both the transmitting node and receiving node, neighbor discovery is achieved during this third timeslot. It should be noted that a spectrum policy that governs the use of frequencies, perhaps at different points in time, might be identical or somewhat different between the transmitting node and receiving node.

Figure 3:
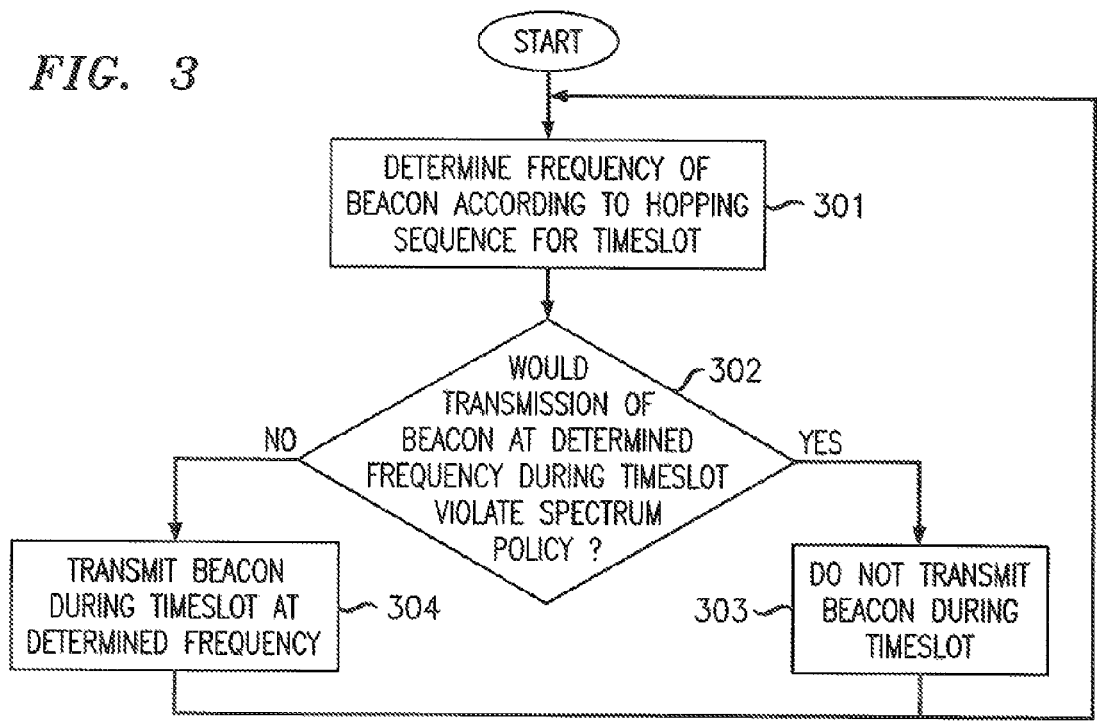
FIG. 3 is a flowchart showing the steps at a transmitting node in accordance with the SFHS embodiment.

The flowchart in FIG. 3 shows the steps at a transmitting node according to this embodiment. At step 301, the transmission frequency of a beacon is determined for a timeslot according to a pseudo-random or cyclic hopping sequence. At step 302, a determination is made whether transmission of a beacon at that frequency would violate spectrum policy during that timeslot. If it would violate spectrum policy, then, at step 303, no beacon is transmitted during that timeslot. If spectrum policy would not be violated, then, at step 304, a beacon at that determined frequency is transmitted during that timeslot.

Figure 4:
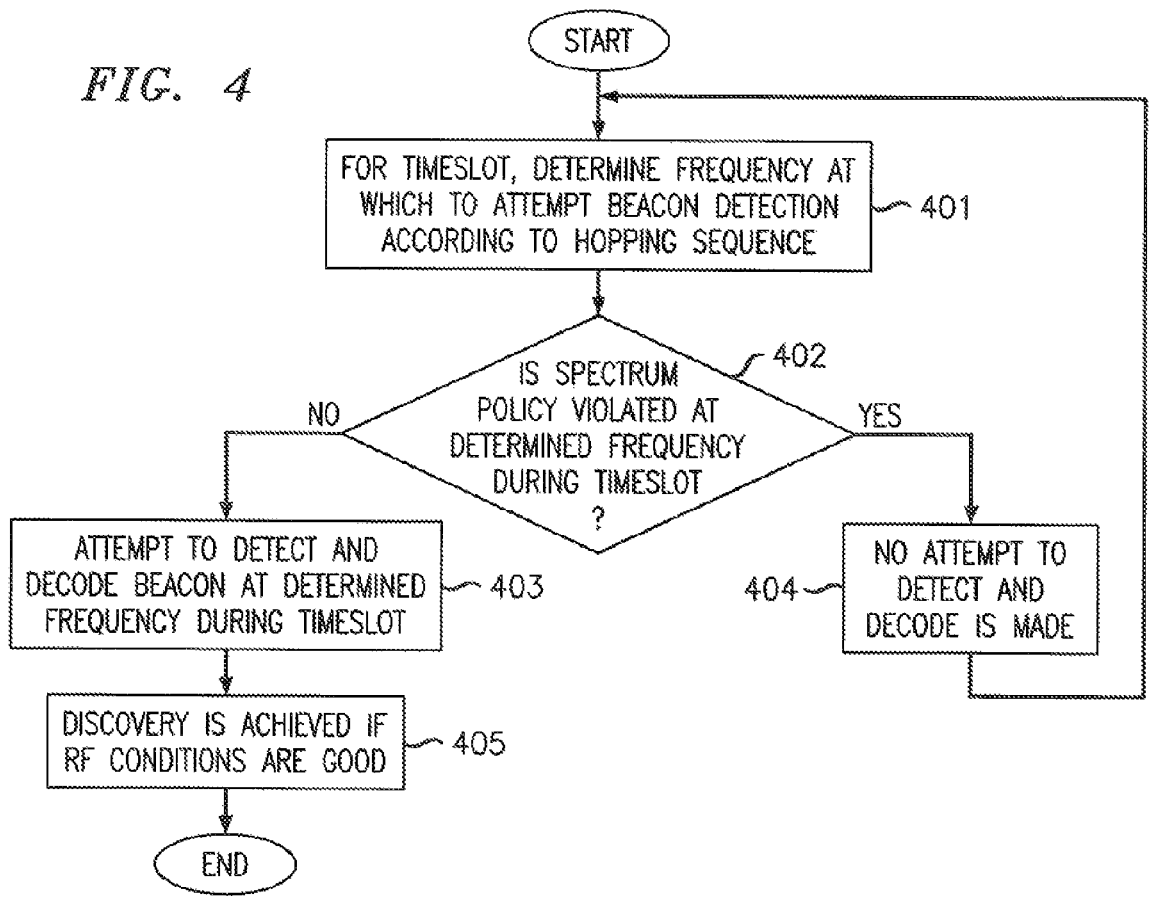
FIG. 4 is a flowchart showing the steps at a receiving node in accordance with the SFHS embodiment.

The flowchart in FIG. 4 shows the corresponding steps at a receiving node according to this embodiment. At step 401, for a timeslot, the frequency at which beacon detection will be attempted is determined according to a known pseudo-random or cyclic frequency hopping sequence. At step 402, a determination is made whether spectrum policy is violated during that timeslot at that frequency. If spectrum policy is violated, then, at step 403, no attempt to detect and decode a beacon at that frequency is made during that timeslot. If spectrum policy is not violated, then, at step 404, at that timeslot an attempt is made to detect and decode a beacon at that frequency and thus, discovery is achieved. At step 405, if RF conditions are sufficient, the receiving node successfully detects and decodes the beacon thereby achieving neighbor discovery between the transmitting node and the receiving node.

In a Multiple Frequency Hopping Sequences with Random Sequence Selection (MFHS-RSS) embodiment, the transmitting and receiving nodes are allowed to choose from among multiple frequency hopping sequences. In this embodiment, it is assumed that a transmitting node randomly selects one of $B_n$ hopping sequences. As per the above-described SFHS method, a transmitting node only transmits a beacon when it is allowed by spectrum policy. For each timeslot, the receiving node randomly selects one of $B_n$ hopping sequences and attempts to decode on the frequency specified by that hopping sequence. Thus, the probability that discovery will occur in a particular timeslot is scaled by $(1/B_n)$ relative to the SFHS method.

Figure 5:
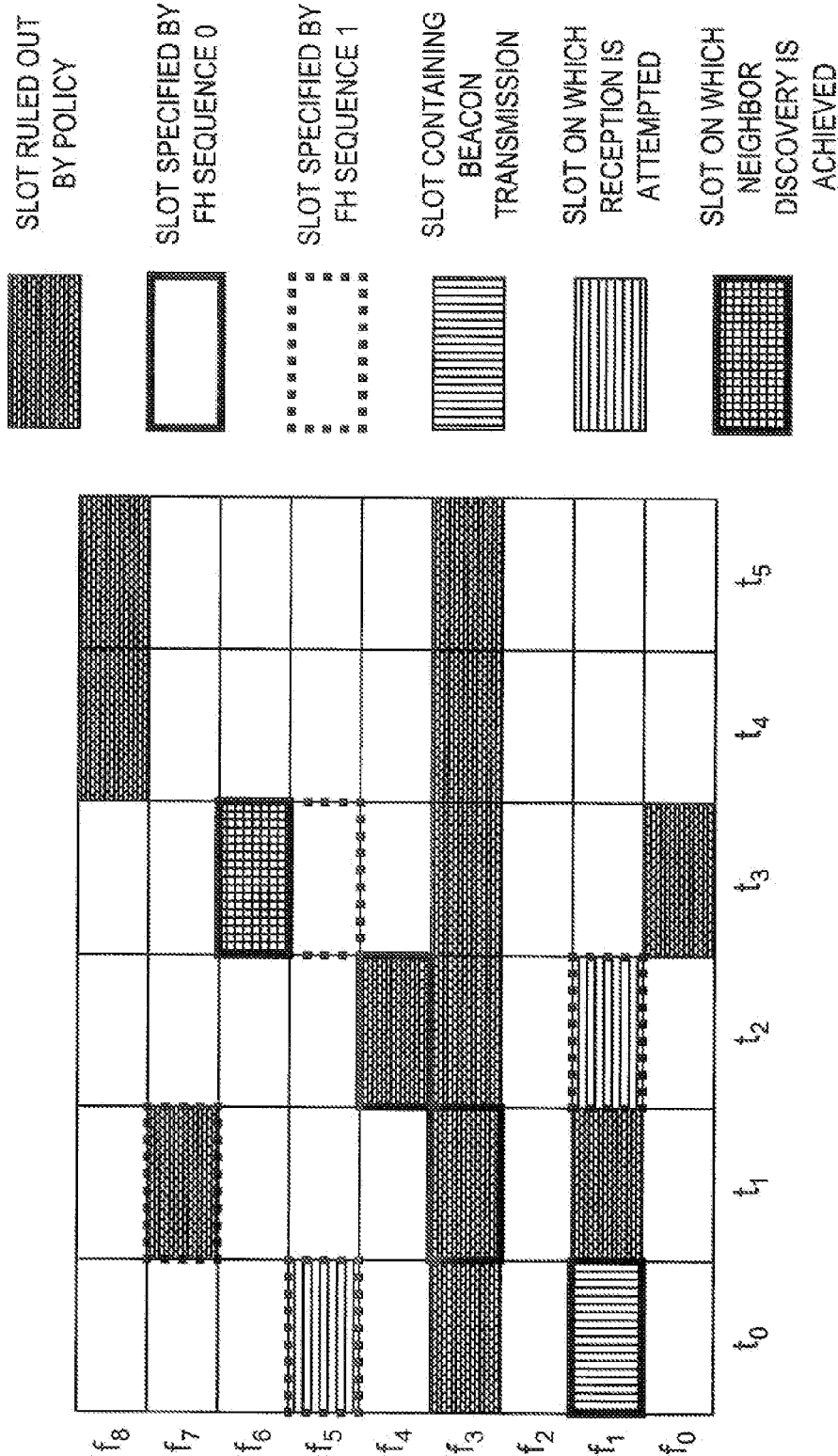
FIG. 5 shows an example of the MFHS-RSS embodiment.

Using the same assumptions described in the SFHS method above, FIG. 5 illustrates an example of the operation of the MFHS-RSS method. In this example embodiment, there are two frequency-hopping sequences. For the first timeslot, $t_0$, FH sequence 0 specifies f1 and FH sequence 1 specifies $f_5$. The transmitting node randomly selects FH sequence 0 and transmits at $f_1$ while the receiving node randomly selects FH sequence 1 and attempts to decode at $f_5$. Neighbor discovery is thus not achieved during timeslot $t_0$. For the second timeslot, $t_1$, the frequencies specified by both FH sequences 0 and 1, $f_3$ and $f_7$, respectively, are disallowed by spectrum policy and neither is transmitted. For the third timeslot, $t_3$, the transmitting node randomly selects FH sequence 0, but the specified frequency, $f_4$, for this FH sequence is disallowed by spectrum policy, so no transmission is made. For the fourth timeslot, $t_3$, both transmitting and receiving nodes select the same hopping sequence, FH sequence 0, and discovery is achieved when the transmitting node transmits a beacon at $f_6$ and the receiving node detects and decodes the beacon on that same frequency.

Figure 6:
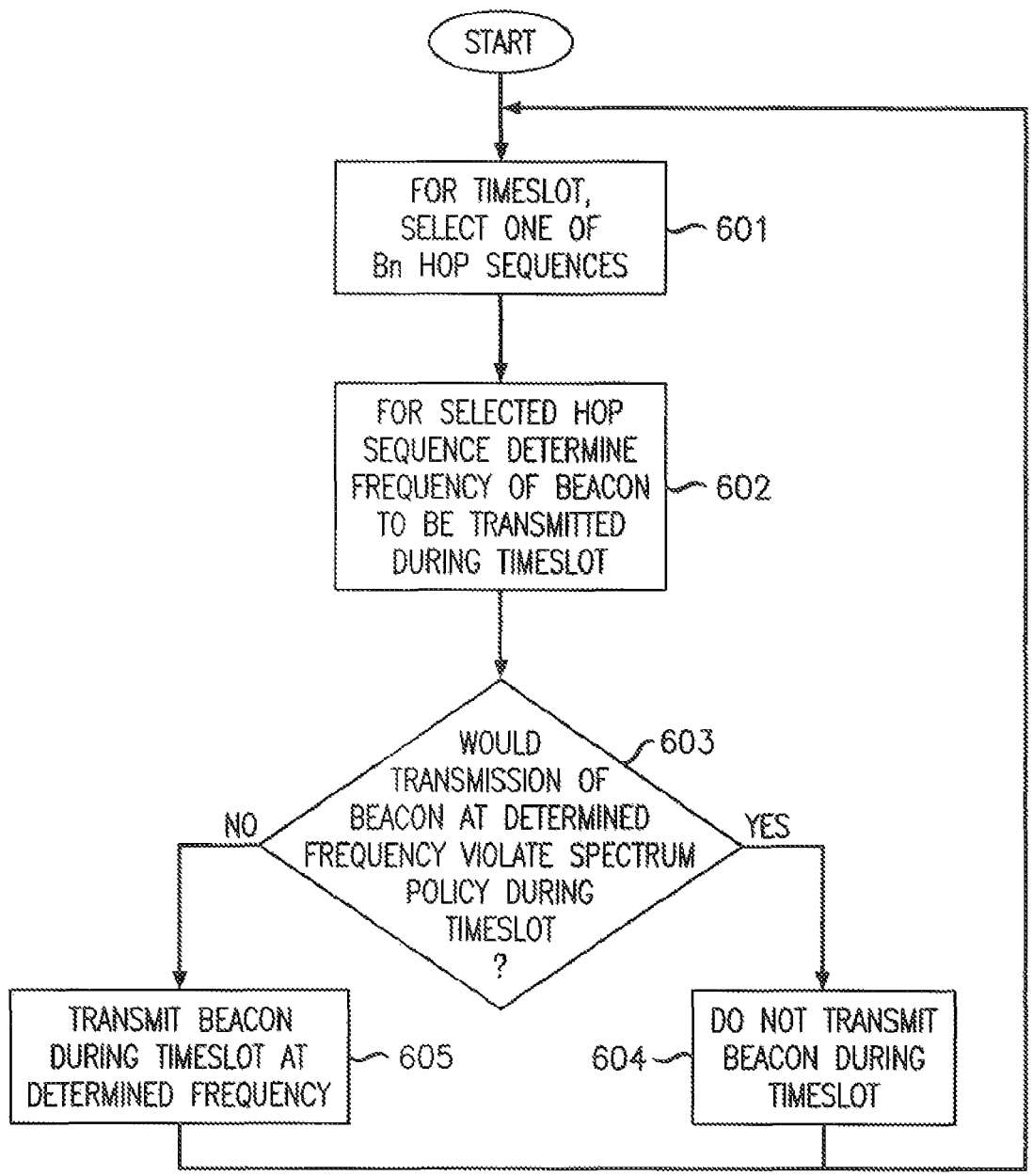
FIG. 6 is a flowchart showing the steps at a transmitting node in accordance with the MFHS-RSS embodiment.

The flowchart in FIG. 6 shows the steps at a transmitting node in accordance with the MFHS-RSS embodiment. At step 601, for a timeslot, one of $B_n$ possible hopping sequences is randomly selected. At step 602, for that timeslot and using the selected hopping sequence, the beacon frequency is determined. At step 603, a determination is made whether transmission of a beacon at the determined frequency during that timeslot would violate spectrum policy. If spectrum policy would be violated, then, at step 604, a beacon is not transmitted during that timeslot. If it does not violate spectrum policy, then, at step 605, a beacon is transmitted at the determined frequency during that timeslot.

Figure 7:
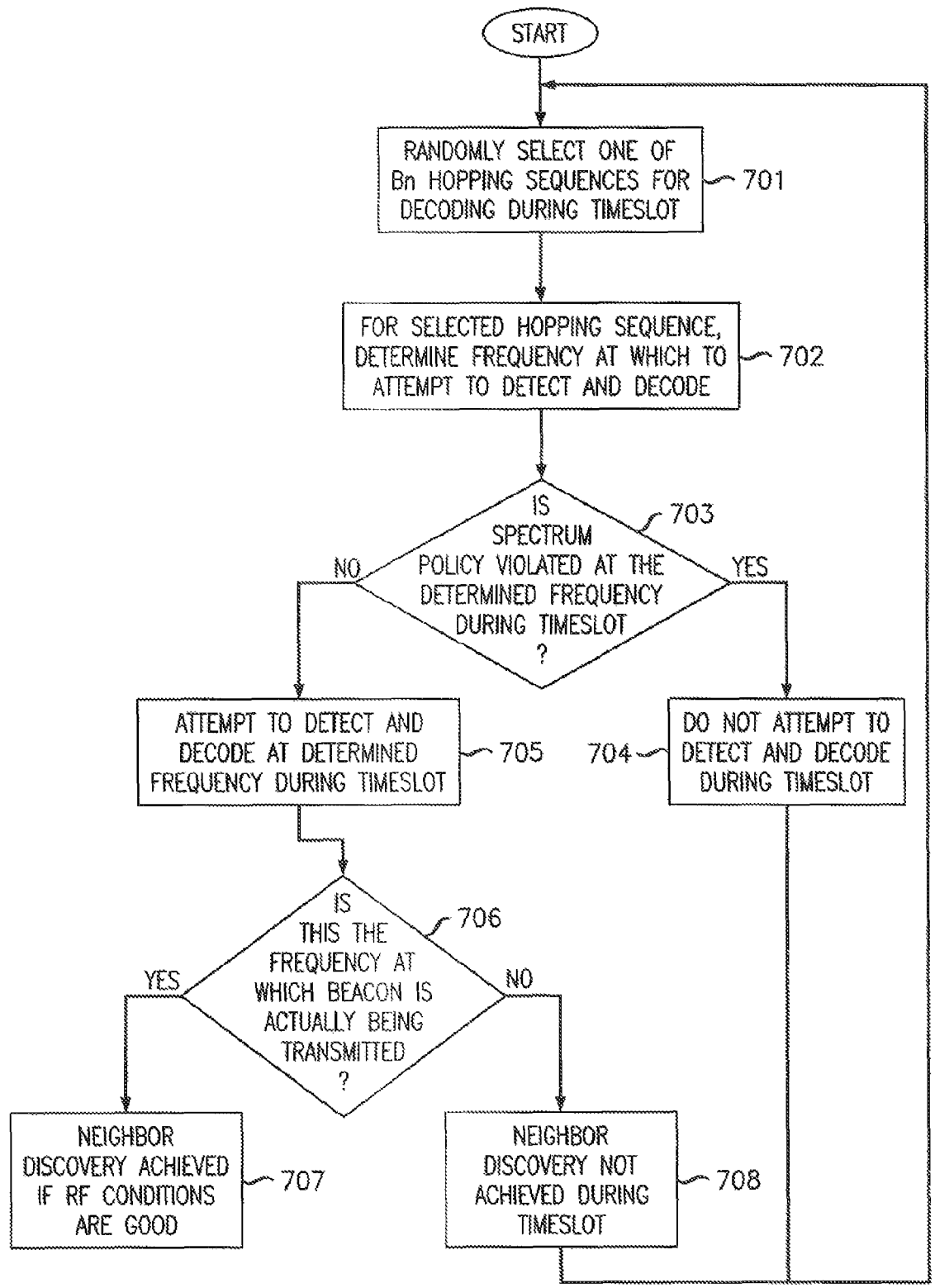
FIG. 7 is a flowchart showing the steps at a receiving node in accordance with the MFHS-RSS embodiment.

The flowchart in FIG. 7 shows the steps at a receiving node in accordance with the MFHS-RSS embodiment. At step 701, for a timeslot, the receiving node randomly or cyclically selects one of the $B_n$ hopping sequences for decoding. At step 702, for the selected hopping sequence, the frequency is determined at which detecting and decoding will be attempted during that timeslot. At step 703, a determination is made whether spectrum policy is violated at that frequency during that timeslot. If violated by spectrum policy, then, at step 704, no attempt is made to detect and decode at that frequency during that timeslot. If spectrum policy is not violated, then, at step 705, during that timeslot, an attempt is made to detect and decode at the frequency specified by the selected hopping sequence. At step 706, a determination is made whether that specified frequency is the frequency at which the transmitting node is actually transmitting a beacon (i.e., the receiving node has correctly selected the hopping sequence being used in that timeslot by the transmitting node). If it is and RF conditions are good, then at step 707, neighbor discovery between the transmitting and receiving nodes is achieved. If it is not the frequency at which the transmitting node is actually transmitting a beacon, at step 708, neighbor discovery is not achieved during that timeslot. Successful neighbor discover awaits another subsequent timeslot when both the transmitting and receiving nodes are transmitting and receiving, respectively, at the same frequency.

The Multiple Frequency Hopping Sequences with Policy Based Sequence Selection (MFHS-PBSS) embodiment is similar to the above-described MFHS-RSS embodiment in that it allows $B_n$ frequency hopping sequences. Unlike the MFHS-RSS embodiment, however, attempts are made to maximize the probability that transmissions are allowed as per prevailing spectrum policy. In particular, for each timeslot, the transmitting node prunes the set of possible $B_n$ hopping sequences by eliminating any hopping sequence whose frequency during that timeslot violates spectrum policy. A frequency for transmitting the beacon during a timeslot is then randomly selected from among the frequencies associated with the remaining subset of allowed candidate hopping sequences. If none of the candidate hopping sequences has during that timeslot an associated frequency that is allowed by spectrum policy, no beacon transmission is made. Similar to the previous MFHS-RSS embodiment, for each timeslot, the receiving node randomly selects one of the $B_n$ hopping sequences and decodes on the frequency specified by that sequence.

Figure 8:
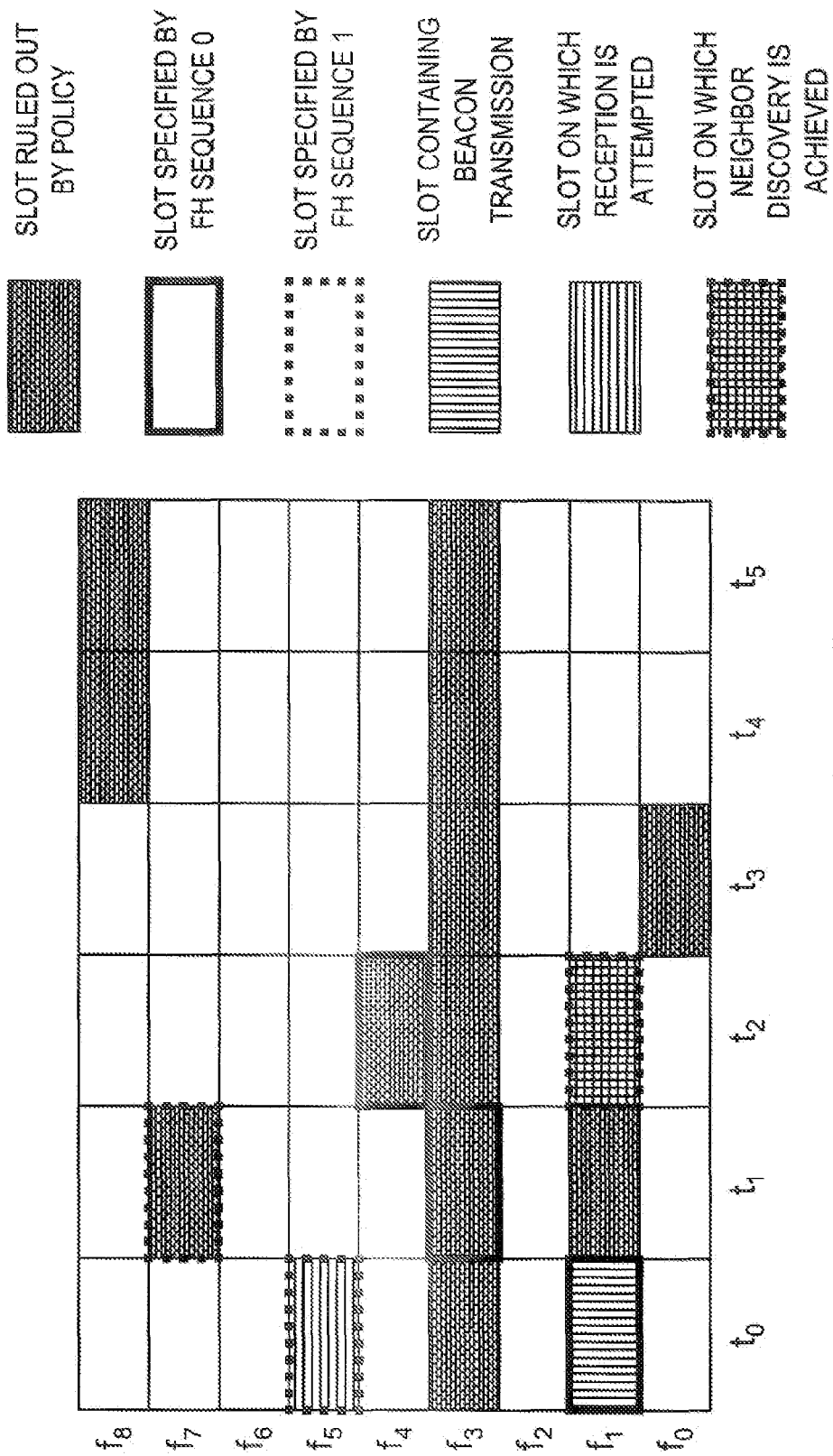
FIG. 8 shows an example of the MFHS-PBSS embodiment.

FIG. 8 illustrates an example of this MFHS-PBSS embodiment. For the first timeslot, $t_0$, the transmitting node randomly selects FH sequence 0 and transmits on $f_1$ and the receiving node randomly selects FH sequence 1 and attempts to decode on $f_5$ so that discovery is not achieved. For the second timeslot, $t_1$, the frequencies, $f_3$ and $f_7$, specified by FH sequence 0 and FH sequence 1, respectively, are both disallowed by policy and no beacon is transmitted. For the third timeslot, $t_2$, the frequency $f_4$, specified by FH sequence 0 is disallowed by policy but the frequency $f_1$ specified by FH sequence 1 is not disallowed so that the transmitting node rules out FH sequence 0 during this timeslot and selects the allowed frequency $f_1$. As noted, the receiving node randomly select FH sequence 1 also, decoding on $f_1$ so that discovery is achieved. Had the receiving node randomly selected FH sequence 0, however, discovery would not have occurred. In an alternate version of this embodiment, the receiving node would similarly avoid choosing FH sequence 0 during timeslot $t_2$ due to policy restrictions and would choose to decode on the allowed frequency, $f_4$, specified by FH sequence 1.

Figure 9:
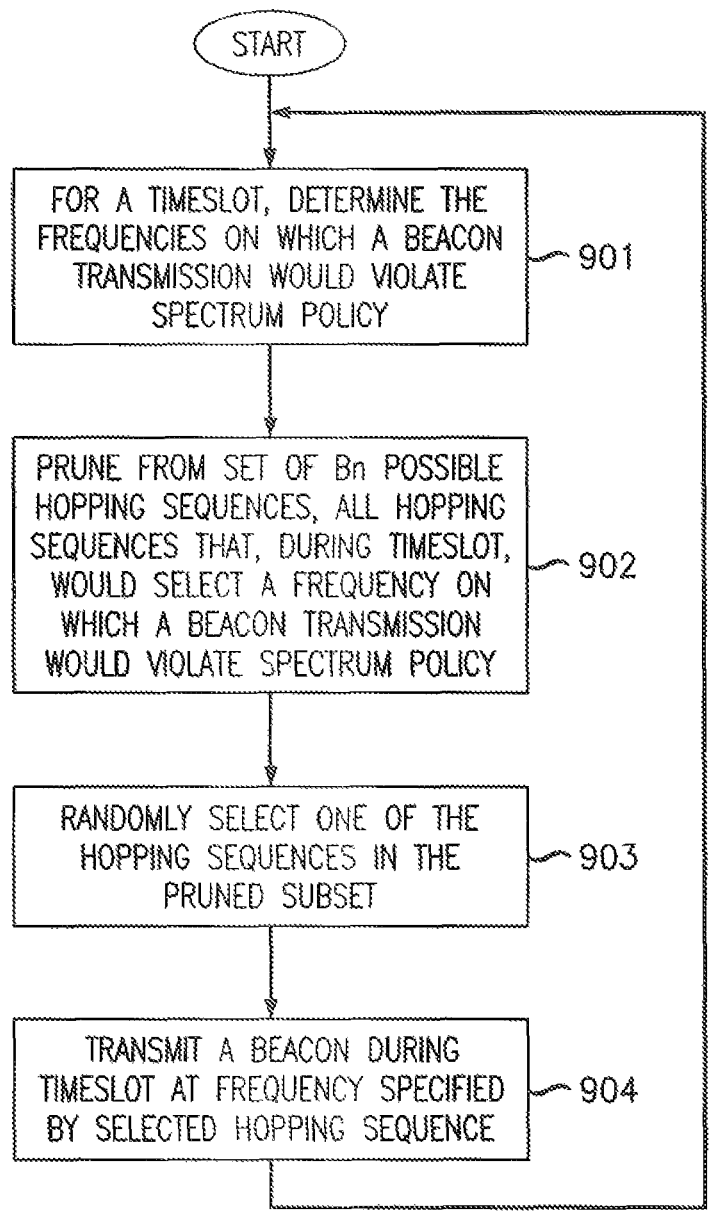
FIG. 9 is a flowchart showing the steps at a transmitting node in accordance with the MFHS-PBSS embodiment.

The flowchart in FIG. 9 shows the steps at a transmitting node according to the MFHS-PBSS embodiment. At step 901, for a timeslot, the frequencies on which a beacon transmission would violate spectrum policy are determined. At step 902, all hopping sequences that during that timeslot would select a frequency on which a beacon transmission would violate spectrum policy are pruned from the set of $B_n$ possible hopping sequences. At step 903, one of the hopping sequences in the pruned subset is randomly selected. At step 904, a beacon is transmitted during the timeslot at the frequency specified by the selected hopping sequence.

The sequence of steps at a receiving node according the MFHS-PBSS embodiment is the same as is shown in FIG. 7 for the above-described MFHS-RSS embodiment. For the alternate version of the MFHS-PBSS embodiment, for a timeslot, before attempting reception, the receiving node randomly selects from among a subset of hopping sequences for which specified frequencies do not violate spectrum policy.

In the Multiple Frequency Hopping Sequences with Sequential Energy Detection and Decoding (MFHS-SeEDD) embodiment, it is assumed that nodes enter transmit, receive, and idle discovery states in frames of L timeslots. Operation at the transmitting node is otherwise identical to the MFHS-RSS embodiment described above. The transmitting node continues to transmit on frequencies when allowed by spectrum policy according to a single selected hopping sequence that is used for each timeslot within the entire frame. The hopping sequence may differ, however, from frame to frame or may be constant across a plurality or all frames. The receiving node operation of this MFHS-SeEDD embodiment differs from the MFHS-RSS embodiment in that the frame is divided into $L_{ED}$ and $L_{DEC}$ timeslots, where $L=L_{ED}+L_{DEC}$. In the first $L_{ED}$ timeslots of a frame in which a receiving node is active, the receiving node performs energy detection across M frequencies and $L_{ED}$ timeslots to reduce the number of candidate hopping sequences from $B_n$. For instance, if at a particular timeslot, FH sequence i indicates beacon transmission on frequency f, but no energy is detected on frequency f, the receiving node assumes that beacon transmission is not occurring using FH sequence i. In this way, energy detection is assumed to be more sensitive than that of decoding and operates without error (e.g. if energy is detected, then it can be assumed that it originates from either a node transmitting a beacon or from an interference source). The number of remaining candidate sequences after energy detection is defined to be $B_c$, where $B_c$ is at most equal to $B_n$. In the last $L_{DEC}$ timeslots of the frame, the receiving node randomly decodes according to the remaining $B_c$ sequences.

Figure 10:
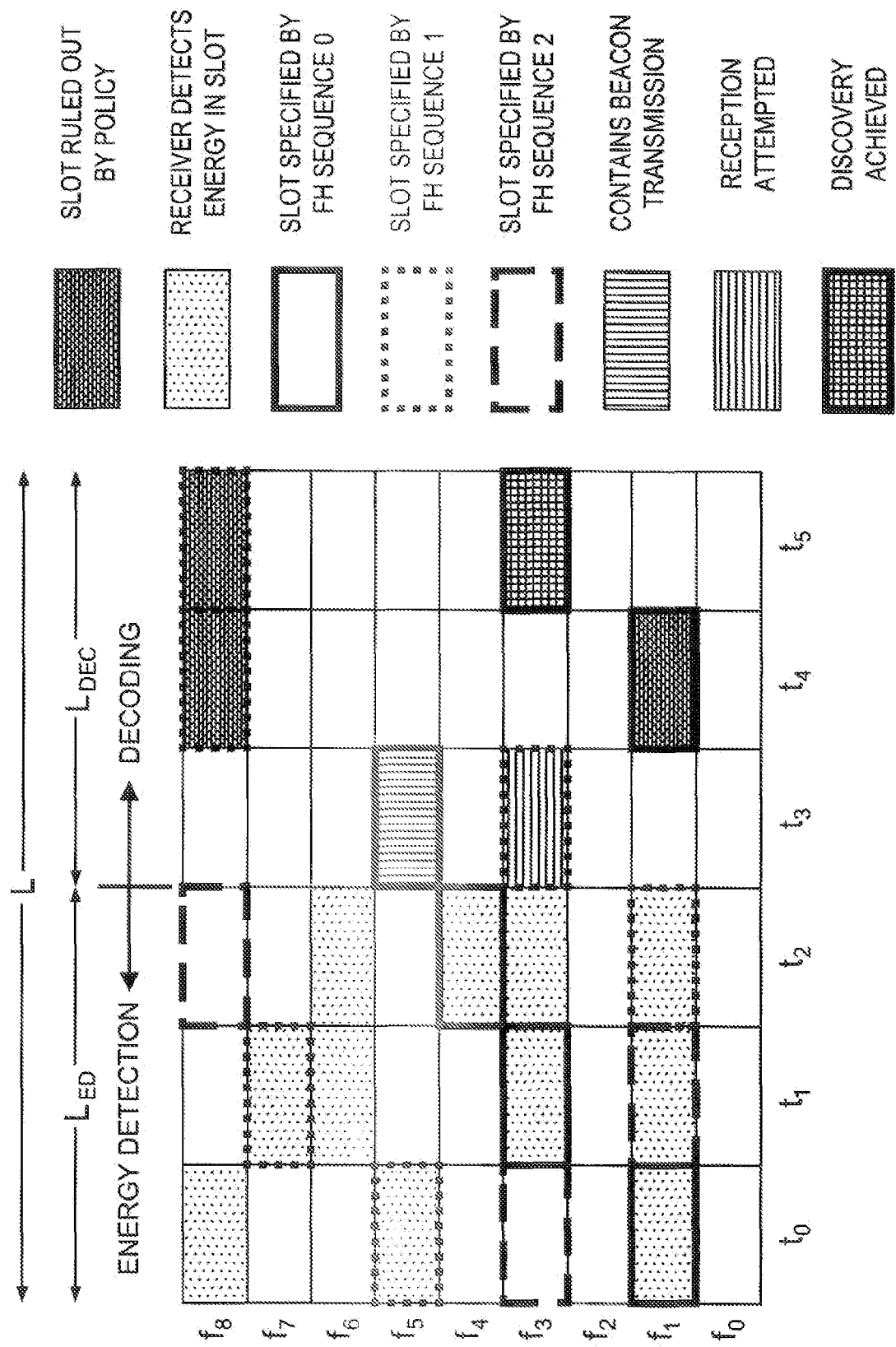
FIG. 10 shows an example of the MFHS-SeEDD embodiment.

FIG. 10 shows an example of this embodiment where L=6 and $L_{ED}=L_{DEC}=3$. Since no energy is detected during $t_0$ at $f_3$ and no energy is detected at $f_8$ during $t_2$, FH sequence 2 is eliminated since that hopping sequence specifies a beacon transmission at those frequencies during those timeslots. In the fourth timeslot, $t_3$, the receiving node begins to decode randomly between the remaining two candidate hopping sequences, FH sequence 0 and FH sequence 1. Alternatively, the receiving node may cycle through the remaining candidate hopping sequences. As shown in FIG. 5, at the fourth timeslot, $t_3$, the receiving node selects to decode on the frequency, $f_3$, specified by FH sequence 1, but the beacon transmission was made on the frequency, $f_5$, specified by FH sequence 0. At the fifth timeslot, $t_4$, both of the frequencies, $f_1$ and $f_8$, specified by FH sequence 0 and FH sequence 1, respectively, are disallowed by spectrum policy and discovery is not achieved. At the sixth timeslot, $t_5$, the beacon transmission is made on $f_3$ in FH sequence 0 and the receiving node also selects FH sequence 0 and chooses to decode on $f_3$. Hence, barring poor RF conditions that prevent successfully decoding of the beacon, discovery is achieved. As in the previous embodiment, both the transmitting and receiving nodes may have selected the same hopping sequence randomly or because selection was influenced by policy that disallowed the frequency specified by hopping sequence 1.

Figure 11:
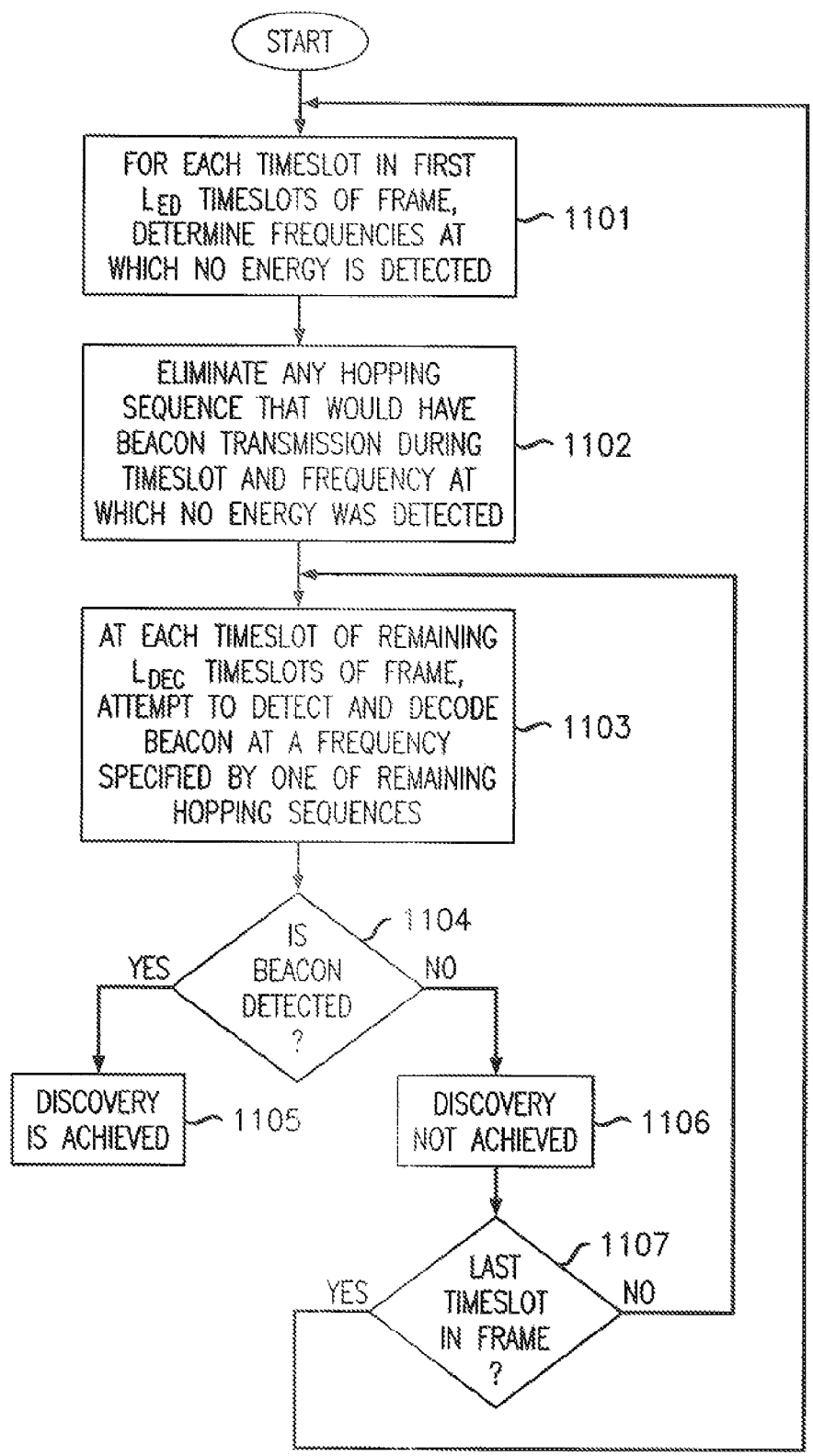
FIG. 11 is a flowchart showing the steps at a receiving node in accordance with the MFHS-SeEDD embodiment.

As noted, the steps at a transmitting node are identical to the MFHS-RSS embodiment as shown in the flowchart of FIG. 6, except that the hopping sequence remains unchanged over each frame of L timeslots. The flowchart in FIG. 11 shows the steps at a receiving node in accordance with the MFHS-SeEDD node. At step 1101, for each timeslot in the first $L_{ED}$ timeslots of a frame of L timeslots, the frequencies at which no energy is detected are determined. At step 1102, hopping sequences that would have a beacon transmission during a timeslot and at a frequency for which no energy was detected are eliminated from the set of $B_n$ possible hopping sequences. At step 1103, at each timeslot of the remaining $L_{DEC}$ timeslots of a frame, an attempt is made to detect and decode a beacon at a frequency specified by one of the remaining possible hopping sequences. At step 1104, a determination is made whether a beacon is detected. If yes, then at step 1105, discovery between the transmitting and receiving nodes is achieved. If a beacon is not detected and decoded, then, at step 1106, discovery is not achieved. At step 1107, then, a determination is made whether this last timeslot was the last timeslot in a frame. If yes, then, the flow returns to step 1101 to process a next frame. If the last timeslot was not the last timeslot in a frame, the flow returns to step 1103 to choose a different hopping sequence and associated frequency on which to attempt detection and decoding for the next timeslot in the current frame.

In the Multiple Frequency Hopping Sequences with Simultaneous Energy Detection and Decoding (MFHS-SiEDD) embodiment, energy detection and decoding can be performed in the same timeslot in contrast with the above-described MFHS-SeEDD embodiment where energy detection and decoding are assumed to be performed in sequence, and where in each timeslot, a receiving node either detects energy or decodes. In the MFHS-SiEDD embodiment, the receiving node performs energy detection in timeslot S and uses the information derived from timeslot S in timeslots with indices greater than S (e.g. to allow processing delay). As in the MFHS-SeEDD embodiment, the same hopping sequence is used throughout the frame consisting of L timeslots. In this MFHS-SiEDD embodiment, the receiving node performs energy detection on successive timeslots, i, for i=1, . . . , L, within a frame, maintaining the number of remaining candidate sequences, $B_{c,i}$, for each successive timeslot such that $B_{c,i}$ is at most equal to $B_{c,i-1}$. The receiving node randomly or cyclically selects a frequency from one of the remaining $B_{c,i}$ candidate sequences to decode, where $B_{c,i}$ may be based on information gathered by energy detection in the current or previous frames.

Figure 12:
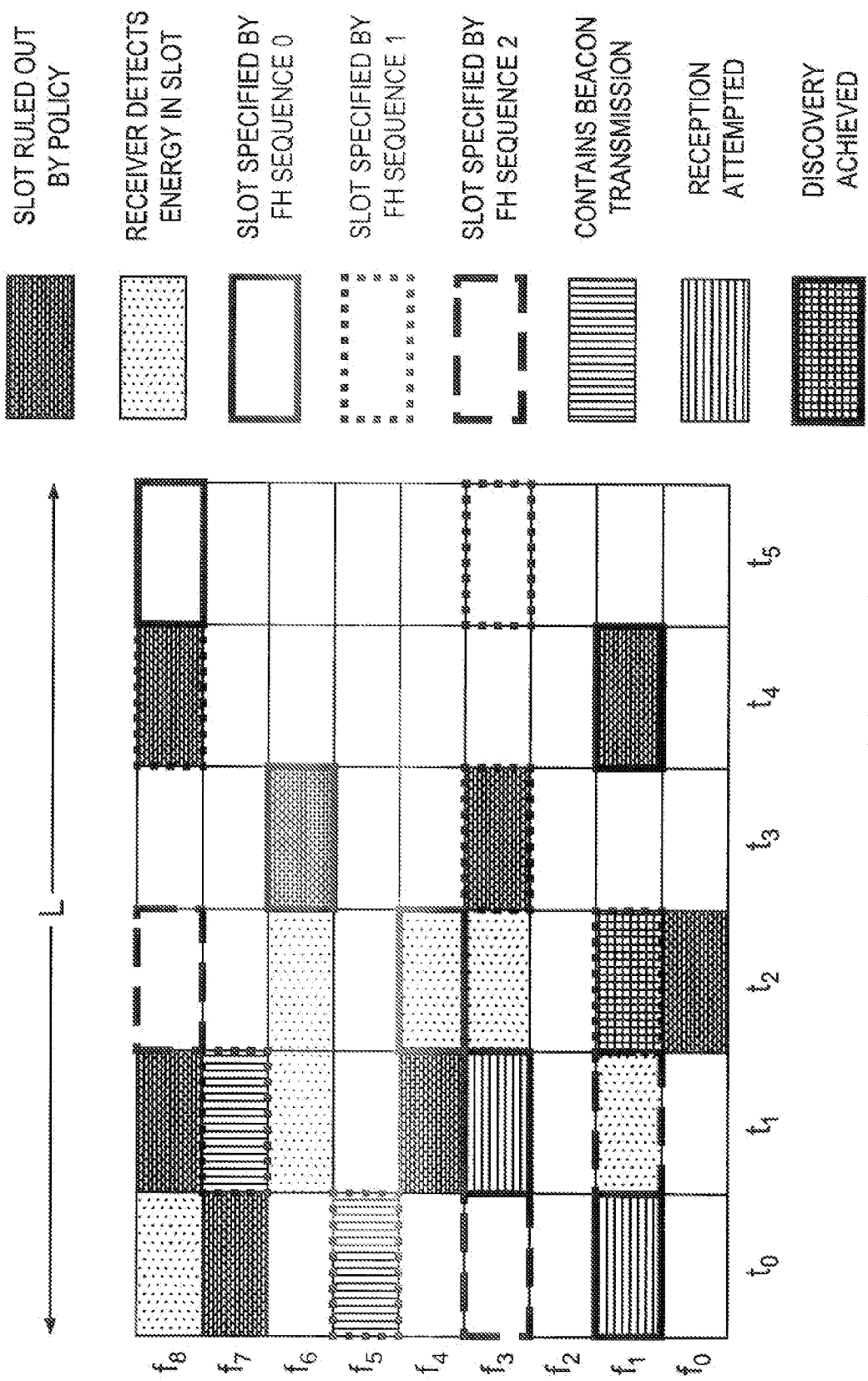
FIG. 12 shows an example of the MFHS-SiEDD embodiment.

FIG. 12 illustrates the operation of this method. In the first timeslot, $t_0$, of a frame consisting of L timeslots, the receiving node detects no energy at frequency $f_3$, the frequency specified by hopping sequence 2. Thus, hopping sequence 2 is eliminated from further consideration as being the hopping sequence in use throughout this frame. During this first timeslot, the receiving node selects to decode at frequency $f_1$, the frequency specified during this timeslot for hopping sequence 0. Since, however, as noted, the transmission was made at frequency $f_5$, the frequency specified by frequency hopping sequence 2, beacon discovery is not achieved. In the second timeslot, $t_1$, energy detection does not provide further information and the receiving node randomly (or in a cyclic manner) selects among the remaining possible hopping sequences 0 and 1, and, in particular, selects frequency hopping sequence 0 and the frequency, $f_3$, associated with that hopping sequence during this timeslot. Since, however, the transmitting node and receiving nodes have selected different hopping sequences, discovery is not achieved. In the third timeslot, $t_2$, however, the receiving node selects $f_1$, the frequency in this timeslot associated with frequency hopping sequence 1, which is the hopping sequence selected by the transmitting node in this frame. Hence, barring poor RF conditions, neighbor discovery is achieved in this timeslot, $t_2$.

Figure 13:
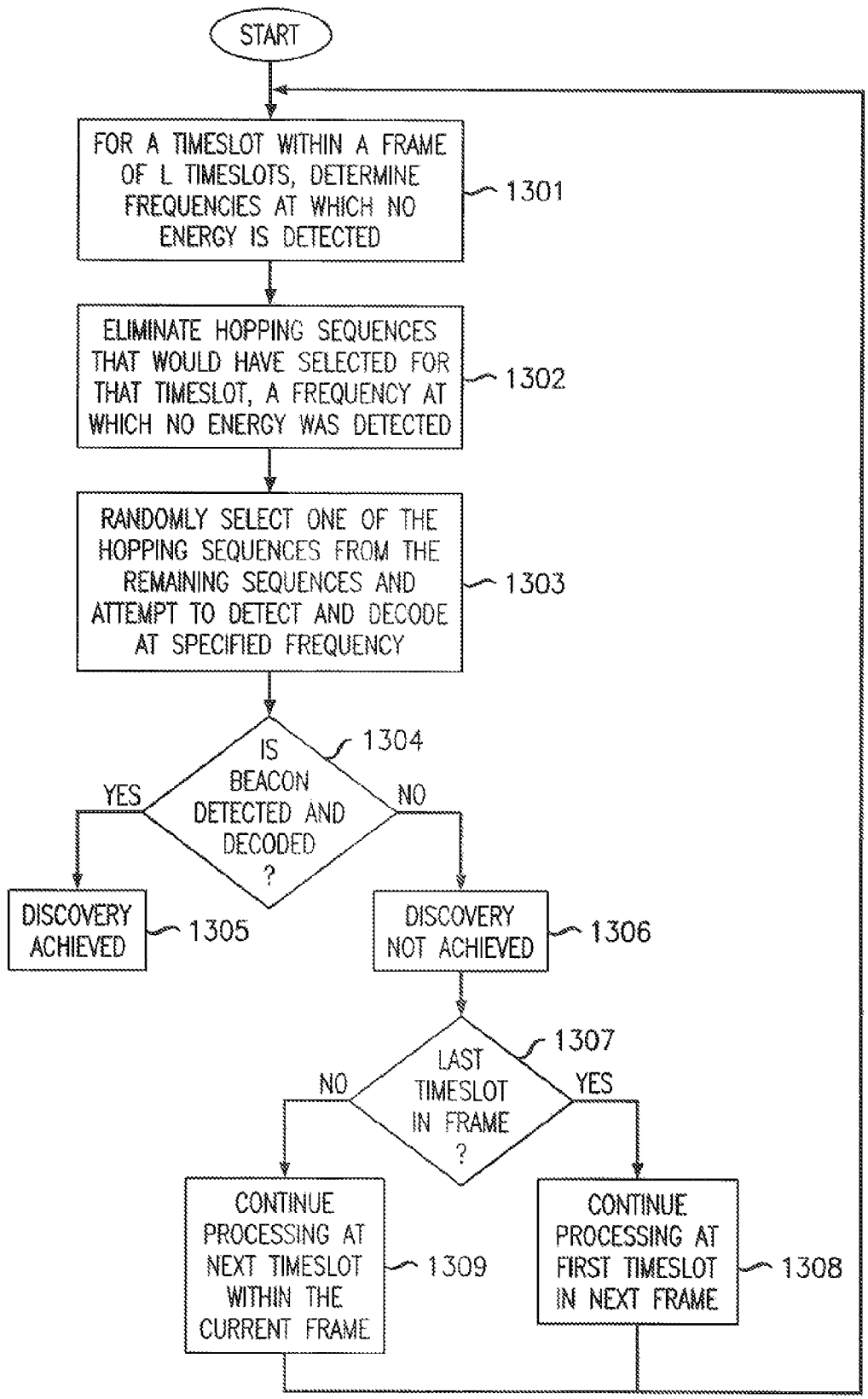
FIG. 13 is a flowchart showing the steps at a receiving node in accordance with the MFHS-SiEDD embodiment.

As in the MFHS-SeEDD embodiment described previously, the steps at a transmitting node for the MFHS-SiEDD are identical to the MFHS-RSS embodiment shown in the flowchart of FIG. 6, except that as in the MFHS-SeEDD embodiment, the hopping sequence remains unchanged over each frame of L timeslots. FIG. 13 is a flowchart showing the steps at a receiving node in accordance with the MFHS-SiEDD mode. At step 1301, for a given timeslot within the frame of L timeslots, the frequency or frequencies at which no energy is detected are determined. At step 1302, for each frequency at which no energy is detected during that timeslot, those hopping sequences for which use would have resulted in energy at such a frequency are eliminated from consideration. At step 1303, during that same timeslot, a hopping sequence is randomly or cyclically selected from the remaining possible hopping sequence and an attempt is made to detect and decode a beacon at the frequency specified by that hopping sequence for that timeslot. At step 1304, a determination is made whether the beacon was detected and decoded. If a beacon was successfully detected and decoded, then, at step 1305, discovery is achieved. If a beacon was not successfully detected and decoded, then, at step 1306, discovery has not been achieved. At step 1307, a determination is made whether the timeslot in which discovery was not achieved was the last timeslot in the frame. If it was the last timeslot, then discovery has not been achieved during the current frame and processing continues, at step 1308, with the first timeslot in the next frame. The flow then returns to step 1301 for processing at first timeslot within the next frame. If, at step 1307, the determination is made that the previously processed timeslot was not the last timeslot in the frame, then processing moves, at step 1309, to the next timeslot within the current frame and the flow returns to step 1301 for processing at that next timeslot, with the hopping sequences eliminated at step 1302 being accumulated with the hopping sequences previously eliminated during processing at a previous timeslot within the current frame.

While the particular invention has been described with reference to the illustrative exemplary embodiments, this description is not meant to be construed in a limiting sense. It is understood that although the present invention has been described, various modifications of the illustrative embodiments, as well as additional embodiments of the invention, will be apparent to one of ordinary skill in the art upon reference to this description without departing from the spirit of the invention, as recited in the claims appended hereto. Those skilled in the art will thus readily recognize that such various other modifications, arrangements and methods can be made to the present invention without strictly following the exemplary embodiments illustrated and described herein and without departing from the spirit and scope of the present invention. It is therefore contemplated that the appended claims will cover any such modifications or embodiments as fall within the true scope of the invention.

The invention claimed is:

1. A method of neighbor discovery between a transmitting node and a receiving node in an ad hoc wireless network in which nodes communicate directly with each other, the method comprising:
at a transmitting node:
transmitting a beacon that changes frequency from timeslot-to-timeslot according to at least one predetermined frequency hopping sequence; and
selecting a frequency hopping sequence used to determine a beacon transmission frequency for a timeslot from among a plurality of different predetermined frequency hopping sequences;
further wherein for a timeslot the frequency hopping sequence is selected from among the plurality of different predetermined frequency hopping sequences that during that timeslot do not violate a spectrum policy.

2. The method of claim 1 wherein the frequency hopping sequence is a pseudo-random sequence.

3. The method of claim 1 wherein the frequency hopping sequence is randomly selected from among the plurality of different predetermined frequency hopping sequences.

4. A method of neighbor discovery between a transmitting node and a receiving node in an ad hoc wireless network in which nodes communicate directly with each other, the method comprising:
at a transmitting node:
transmitting a beacon that changes frequency from timeslot-to-timeslot according to at least one predetermined frequency hopping sequence; and
selecting a frequency hopping sequence used to determine a beacon transmission frequency for a timeslot from among a plurality of different predetermined frequency hopping sequences;
wherein the frequency hopping sequence is randomly selected from among the plurality of different predetermined frequency hopping sequences that during that timeslot do not violate a spectrum policy.

5. A method of neighbor discovery between a transmitting node and a receiving node in an ad hoc wireless network in which nodes communicate directly with each other, the method comprising:
at a transmitting node:
transmitting a beacon that changes frequency from timeslot-to-timeslot according to at least one predetermined frequency hopping sequence; and
selecting a frequency hopping sequence used to determine a beacon transmission frequency for a timeslot from among a plurality of different predetermined frequency hopping sequences;
wherein, for a given timeslot, the beacon is not transmitted when its transmission at the frequency determined by the frequency hopping sequence during that timeslot would violate a spectrum policy; and
further wherein the frequency hopping sequence that is selected from among the plurality of predetermined frequency hopping sequences remains unchanged for each timeslot within a frame comprising a predetermined number of timeslots and the frequency hopping sequence selected for each frame is randomly selected from among the plurality of predetermined frequency hopping sequences.

6. A method of neighbor discovery between a transmitting node and a receiving node in an ad hoc network in which nodes communicate directly with each other, the method comprising:
at a receiving node:
during a timeslot, attempting to detect and decode a beacon being transmitted by the transmitting node that is changing frequency from timeslot-to-timeslot according to a frequency hopping sequence, wherein at a timeslot at which a beacon is transmitted by the transmitting node, the frequency hopping sequence is selected by the transmitting node from among a plurality of different predetermined frequency hopping sequences and during each such timeslot the receiving node selects one of the plurality of different predetermined frequency hopping sequences in attempting to detect and decode the transmitted beacon and further wherein a beacon is not transmitted during a timeslot when the frequency hopping sequence indicates a frequency that would violate spectrum policy during such timeslot, and wherein neighbor discovery with the transmitting node is achieved when the beacon is successfully detected and decoded.

7. The method of claim 6 wherein the frequency hopping sequence is a pseudo-random sequence.

8. The method of claim 6 wherein at each such timeslot the receiving node randomly selects one of the plurality of different predetermined frequency hopping sequences.

9. The method of claim 6 wherein at each such timeslot the receiving node selects one of the plurality of different predetermined frequency hopping sequences from among those that indicate a beacon frequency that does not violate spectrum policy during that timeslot.

10. The method of claim 6 wherein the frequency hopping sequence selected by the transmitting node from among the plurality of different frequency hopping sequences remains unchanged for each timeslot within a frame comprising a predetermined number of timeslots, the receiving node:
performing energy detection at each potential beacon frequency during each timeslot in a subset of the predetermined number of timeslots in the frame;
eliminating as a possible frequency hopping sequence used by the transmitting node any hopping sequence which would have transmitted a beacon at a frequency at which no energy was detected during at least one of the timeslots in the subset of timeslots in the frame;
attempting to detect and decode a beacon during a timeslot that is after the subset of timeslots within the frame using a non-eliminated frequency hopping sequence.

11. The method of claim 6 wherein the frequency hopping sequence selected by the transmitting node from among the plurality of different predetermined frequency hopping sequences remains unchanged for each timeslot within a frame comprising a predetermined number of timeslots, the receiving node:
a) performing energy detection at each potential beacon frequency during at least one timeslot within the frame;
b) eliminating as a possible frequency hopping sequence used by the transmitting node any hopping sequence which would have transmitted a beacon at a frequency at which no energy was detected during the at least one predetermined timeslot;
c) attempting to detect and decode a beacon during the at least one timeslot within the frame using a non-eliminated frequency hopping sequence; and
d) repeating steps a) through c) during successive other timeslots within the frame, wherein the eliminated possible frequency hopping sequences are accumulated.

* * * * *